(12) United States Patent
Lee

(10) Patent No.: US 10,132,710 B2
(45) Date of Patent: Nov. 20, 2018

(54) SHAFT PRECISION AUTOMATIC MEASURING DEVICE FOR MOTOR

(71) Applicant: FANUC CORPORATION, Yamanashi (JP)

(72) Inventor: Seungjun Lee, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 41 days.

(21) Appl. No.: 15/453,178

(22) Filed: Mar. 8, 2017

(65) Prior Publication Data
US 2017/0261395 A1    Sep. 14, 2017

(30) Foreign Application Priority Data

Mar. 11, 2016  (JP) .................................. 2016-048313

(51) Int. Cl.
    *G01M 1/16*    (2006.01)
    *G01M 1/30*    (2006.01)
    (Continued)

(52) U.S. Cl.
    CPC .............. *G01M 1/16* (2013.01); *G01B 5/0002* (2013.01); *G01B 5/003* (2013.01); *G01B 5/201* (2013.01); *G01B 11/2408* (2013.01); *G01M 1/30* (2013.01)

(58) Field of Classification Search
    CPC ........ G01M 1/30; G01M 1/16; G01B 5/0002; G01B 5/003; G01B 5/201; G01B 11/2408
    See application file for complete search history.

(56) References Cited

U.S. PATENT DOCUMENTS 5,365,458 A    11/1994  Tamura et al.
5,735,028 A *   4/1998  Furusawa ............ G05B 19/404
                                                29/27 R
(Continued)

FOREIGN PATENT DOCUMENTS

JP    S46-000695 Y1    1/1971
JP    S63-113344 A     5/1988
(Continued)

OTHER PUBLICATIONS

An Office Action; "Decision to Grant a Patent" issued by the Japanese Patent Office dated Mar. 6, 2018, which corresponds to Japanese Patent Application No. 2016-048313.

*Primary Examiner* — Helen C Kwok
(74) *Attorney, Agent, or Firm* — Studebaker & Brackett PC

(57) ABSTRACT

A shaft precision automatic measurement device for motors is provided that is able to automatically measure shaft precision of a motor. A shaft precision automatic measurement device (1) for a motor (9) includes: a gripping mechanism (3) that grips the shaft (7); a first contact-type displacement sensor (41) that is able to measure a position of the flange face (82) by contacting to follow the flange face (82); a second contact-type displacement sensor (42) that is able to measure a position of the fitting face (81) by contacting to follow the fitting face (81); a rotary mechanism (5) that causes the device main body (2) to rotate in a state gripping the shaft (7) by the gripping mechanism (3) and executing measurement by way of the respective displacement sensors; a displacement data acquisition part (63) that acquires displacement data of the flange face (82) and displacement data of the fitting face (81); and a measurement part (64) that measures center runout and face deflec- (Continued)

tion of the shaft (7) based on the respective displacement data acquired by the displacement data acquisition part (63).

12 Claims, 14 Drawing Sheets

(51) Int. Cl.
    *G01B 5/00*     (2006.01)
    *G01B 11/24*     (2006.01)
    *G01B 5/20*     (2006.01)

(56) References Cited

U.S. PATENT DOCUMENTS

| | | | | |
|---|---|---|---|---|
| 5,863,136 A * | 1/1999 | Miyazaki | ................ | F16C 19/54 |
| | | | | 384/448 |
| 2003/0117590 A1 * | 6/2003 | Hunziker | ............... | G02B 7/003 |
| | | | | 353/30 |
| 2004/0143413 A1 * | 7/2004 | Oystol | ................... | G01C 17/38 |
| | | | | 702/150 |
| 2004/0226336 A1 * | 11/2004 | George | .................... | B21D 3/16 |
| | | | | 72/362 |
| 2016/0341548 A1 * | 11/2016 | Lee | ...................... | G01B 11/272 |

FOREIGN PATENT DOCUMENTS

| | | |
|---|---|---|
| JP | H04-269601 A | 9/1992 |
| JP | H05-227710 A | 9/1993 |
| JP | H07-260425 A | 10/1995 |
| JP | H09-152302 A | 6/1997 |
| JP | H09-280804 A | 10/1997 |
| JP | 2002-054917 A | 2/2002 |
| JP | 2005-326302 A | 11/2005 |
| JP | 2006-215046 A | 8/2006 |
| JP | 2009-236571 A | 10/2009 |

* cited by examiner

SHAFT PRECISION AUTOMATIC MEASURING DEVICE FOR MOTOR

This application is based on and claims the benefit of priority from Japanese Patent Application No. 2016-048313, filed on 11 Mar. 2016, the content of which is incorporated herein by reference.

BACKGROUND OF THE INVENTION

Field of the Invention

The present invention relates to a shaft precision automatic measuring device for a motor.

Related Art

Conventionally, the shaft of a motor is inserted through front and rear bearings, and assembled in a stator. At this time, the machining precision and assembly precision of the shaft affect the shaft precision such as the rotary deflection (shaft deflection), displacement of shaft center (eccentricity) and slant of the shaft (deflection angle) due to the flexibility, etc. of the shaft. In the case of the shaft precision being low, in addition to becoming a cause of vibration and abnormal noises when the motor is assembled in a machine tool or the like, it adversely affects the machining precision of the machine tool; therefore, measurement of the shaft precision is performed after motor assembly.

Herein, various technologies have been proposed as technologies for measuring the shaft precision of a rotating body such as a motor (e.g., refer to Patent Documents 1 to 4). However, none of the technologies give sufficient consideration to automation, and the current situation is that measurement of the shaft precision in practice is performed by manual labor. More specifically, a dial gauge is attached to the motor main body or shaft, and an laborer performs measurement while rotating the shaft in this state to determine the shaft precision based on the deviation range of the measured values obtained.

Patent Document 1: Japanese Unexamined Patent Application, Publication No. H04-269601

Patent Document 2: Japanese Unexamined Patent Application, Publication No. H05-227710

Patent Document 3: Japanese Unexamined Patent Application, Publication No. H07-260425

Patent Document 4: Japanese Unexamined Patent Application, Publication No. H09-280804

SUMMARY OF THE INVENTION

However, in the measurement of the shaft precision using a dial gauge, the measurement workload by a laborer, such as the mounting of the dial gauge, contact adjustment of the measurement head (probe) of the dial gauge, measurement while rotating the shaft of the motor, confirmation and recording of measurement values, is large and the productivity is low. In addition, since mistakes such as variance in the way of contacting of the gauge head of the dial gauge and misreading of the measurement values by the laborer can also occur, variance tends to occur in the results, whereby the inspection accuracy is low. In the case of the number of motors being great, there is also a problem in that complete inspection is not possible due to man-hour limitations, and thus must become sequential sampling inspection. For this reason, the development of a device capable of automatically measuring the shaft precision of a motor has been desired.

The present invention has been made taking account of the above-mentioned situation, and has an object of providing a shaft precision automatic measurement device for a motor that is able to automatically measure the shaft precision of a motor.

A shaft precision automatic measurement device for a motor according to a first aspect of the present invention is a shaft precision automatic measurement device (e.g., the shaft precision automatic measurement device 1 for a motor described later) for a motor (e.g., the motor 9 described later) that includes a shaft (e.g., the shaft 7 described later), and a motor main body (e.g., the motor main body 8 described later) having a flange face (e.g., the flange face 82 described later) and a fitting face (e.g., the fitting face 81 described later) to be fitted to a mounting target of the motor, the device including: a device main body (e.g., the device main body 2 described later); a gripping part (e.g., the gripping mechanism 3, gripping control part 61 described later) that is provided to the device main body, and grips the shaft; a first contact-type displacement sensor (e.g., the first contact-type displacement sensor 41 described later) that is provided to the device main body, and is able to measure a position of the flange face by contacting to follow the flange face; a second contact-type displacement sensor (e.g., the second contact-type displacement sensor 42 described later) that is provided to the device main body, and is able to measure a position of the fitting face by contacting to follow the fitting face; a rotary part (e.g., the rotary mechanism 5, rotation control part 62 described later) that causes the device main body to rotate in a state gripping the shaft by way of the gripping part, and executing measurement by way of the first contact-type displacement sensor and the second contact-type displacement sensor; a displacement data acquisition part (e.g., the displacement data acquisition part 63 described later) that acquires displacement data of the flange face from the first contact-type displacement sensor and displacement data of the fitting face from the second contact-type displacement sensor; and a measurement part (e.g., the measurement part 64 described later) that, when defining, while causing the shaft to rotate, one or both of shaft deflection that indicates rotary deflection of a leading end of the shaft, and eccentricity that indicates a shift in center line of the shaft relative to a central axis of the motor main body as center runout, and defining deflection angle that indicates slope of the shaft relative to the flange face as face deflection, measures the center runout and face deflection of the shaft based on respective displacement data acquired by the displacement data acquisition part.

In addition, a shaft precision automatic measurement device for a motor according to a second aspect of the present invention is a shaft precision automatic measurement device (e.g., the shaft precision automatic measurement device 1A for a motor described later) for a motor (e.g., the motor 9 described later) that includes a shaft (e.g., the shaft 7 described later), and a motor main body (e.g., the motor main body 8 described later) having a flange face (e.g., the flange face 82 described later) and a fitting face (e.g., the fitting face 81 described later) to be fitted to a mounting target of the motor, the device including: a device main body (e.g., the device main body 2 described later); a gripping part (e.g., the gripping mechanism 3, gripping control part 61 described later) that is provided to the device main body, and grips the shaft; a first laser-type displacement sensor (e.g., the first laser-type displacement sensor 241 described later) that is provided to the device main body, and is able to measure a position of the flange face by way of reflected light when irradiating a laser beam onto the flange face; a second laser-type displacement sensor (e.g., the second laser-type displacement sensor 242 described later) that is provided to the device main body, and is able to measure a position of the fitting face by way of reflected light when irradiating a laser beam onto the fitting face; a rotary part (e.g., the rotary mechanism 5, rotation control part 62 described later) that causes the device main body to rotate in a state gripping the shaft by way of the gripping part, and executing measurement by way of the first laser-type displacement sensor and the second laser-type displacement sensor; a displacement data acquisition part (e.g., the displacement data acquisition part 63 described later) that acquires displacement data of the flange face from the first laser-type displacement sensor and displacement data of the fitting face from the second laser-type displacement sensor; and a measurement part (e.g., the measurement part 64 described later) that, when defining, while causing the shaft to rotate, one or both of shaft deflection that indicates rotary deflection of a leading end of the shaft, and eccentricity that indicates a shift in center line of the shaft relative to a central axis of the motor main body as center runout, and defining deflection angle that indicates slope of the shaft relative to the flange face as face deflection, measures the center runout and face deflection of the shaft based on respective displacement data acquired by the displacement data acquisition part.

In addition, a shaft precision automatic measurement device for a motor according to a third aspect of the present invention is a shaft precision automatic measurement device (e.g., the shaft precision automatic measurement device 1B for a motor described later) for a motor (e.g., the motor 9 described later) that includes a shaft (e.g., the shaft 7 described later), and a motor main body (e.g., the motor main body 8 described later) having a flange face (e.g., the flange face 82 described later) and a fitting face (e.g., the fitting face 81 described later) to be fitted to a mounting target of the motor, the device including: a device main body (e.g., the device main body 2 described later); a gripping part (e.g., the gripping mechanism 3, gripping control part 61 described later) that is provided to the device main body, and grips the shaft; a first jig (e.g., the first jig 10 described later) that is provided to the device main body, is movable in a direction intersecting the flange face, and has a laser-beam reflecting plate (e.g., the laser-beam reflecting plate 11 described later); a first laser-type displacement sensor (e.g., the first laser-type displacement sensor 341 described later) that is provided to the device main body, and is able to measure a position of the first jig by way of reflected light when irradiating a laser beam onto the laser-beam reflecting plate of the first jig; a first probe (e.g., the first probe 441 described later) that is fixed to the first jig, and contacts to follow the flange face by the first jig moving in a direction intersecting the flange face; a second jig (e.g., the second jig 20 described later) that is provided to the device main body, is movable in a direction intersecting the fitting face, and has a laser-beam reflecting plate (e.g., the laser-beam reflecting plate 21 described later); a second laser-type displacement sensor (e.g., the second laser-type displacement sensor 342 described later) that is provided to the device main body, and is able to measure a position of the second jig by way of reflected light when irradiating a laser beam onto the laser-beam reflecting plate of the second jig; a second probe (e.g., the second probe 442 described later) that is fixed to the second jig, and contacts to follow the fitting face by the second jig moving in a direction intersecting the fitting face; a rotary part (e.g., the rotary mechanism 5, rotation control part 62 described later) that causes the device main body to rotate in a state gripping the shaft by way of the gripping part, and executing measurement by way of the first laser-type displacement sensor and the second laser-type displacement sensor; a displacement data acquisition part (e.g., the displacement data acquisition part 63 described later) that acquires displacement data of the first jig from the first laser-type displacement sensor and displacement data of the second jig from the second laser-type displacement sensor; and a measurement part (e.g., the measurement part 64 described later) that, when defining, while causing the shaft to rotate, one or both of shaft deflection that indicates rotary deflection of a leading end of the shaft, and eccentricity that indicates a shift in center line of the shaft relative to a central axis of the motor main body as center runout, and defining deflection angle that indicates slope of the shaft relative to the flange face as face deflection, measures the shaft deflection, eccentricity and deflection angle of the shaft based on displacement data acquired by the displacement data acquisition part.

Furthermore, according to a fourth aspect of the present invention, the shaft precision automatic measurement device for a motor as described in any one of the first to third aspects may further include: a learning part (e.g., the learning part 65 described later) that learns a gripping condition of the gripping part and a rotating condition of the rotary part, when measured values of the shaft deflection, eccentricity and deflection angle of the shaft obtained by executing measurement by way of the measurement part become stable values while varying at least one among the gripping condition of the gripping part and the rotating condition of the rotary part.

Moreover, according to a fifth aspect of the present invention, the shaft precision automatic measurement device for a motor as described in any one of the first to fourth aspects may further include: an abnormality determination part (e.g., the abnormality determination part 66 described later) that determines whether the shaft of the motor is abnormal based on measured values of shaft deflection, eccentricity and deflection angle of the shaft obtained by executing measurement by way of the measurement part; and a feedback control part (e.g., the feedback control part 67 described later) that automatically feeds back an abnormality determination result thereof to a manufacturing process of the motor, in a case of being determined that the shaft of the motor is abnormal by way of the abnormality determination part.

According to the shaft precision automatic measurement device for a motor according to the present invention, it is possible to automatically measure the shaft precision of motors, and thus complete inspection becomes possible.

DETAILED DESCRIPTION OF THE INVENTION

Hereinafter, a first embodiment of the present invention will be explained in detail while referencing the drawings. It should be noted that, in the explanations of the second embodiment and later, the same reference symbols are assigned to configurations shared with the first embodiment, and explanations thereof will be omitted.

First Embodiment

Figure 1:
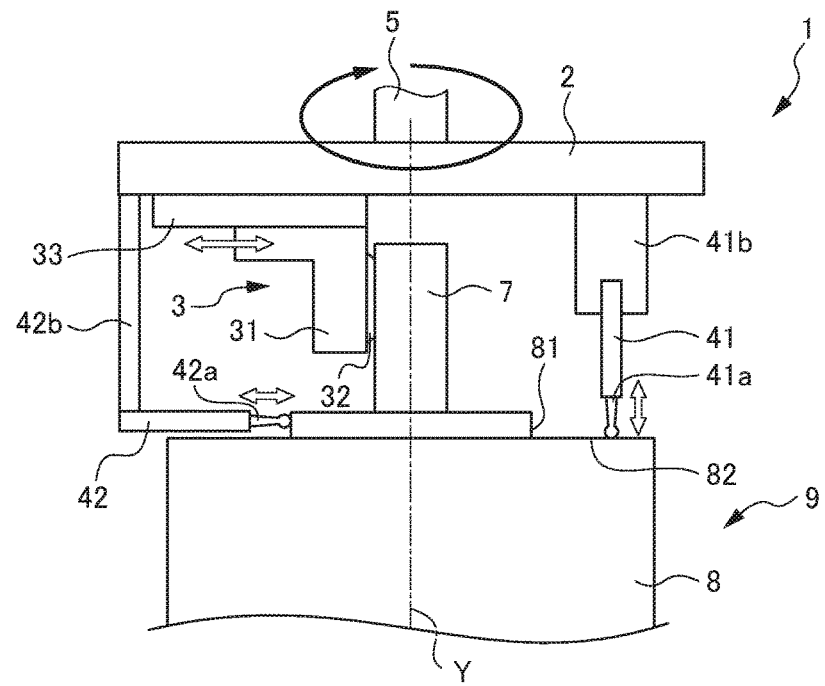
FIG. 1 is a side view of a shaft precision automatic measuring device for a motor according to a first embodiment.
Figure 2:
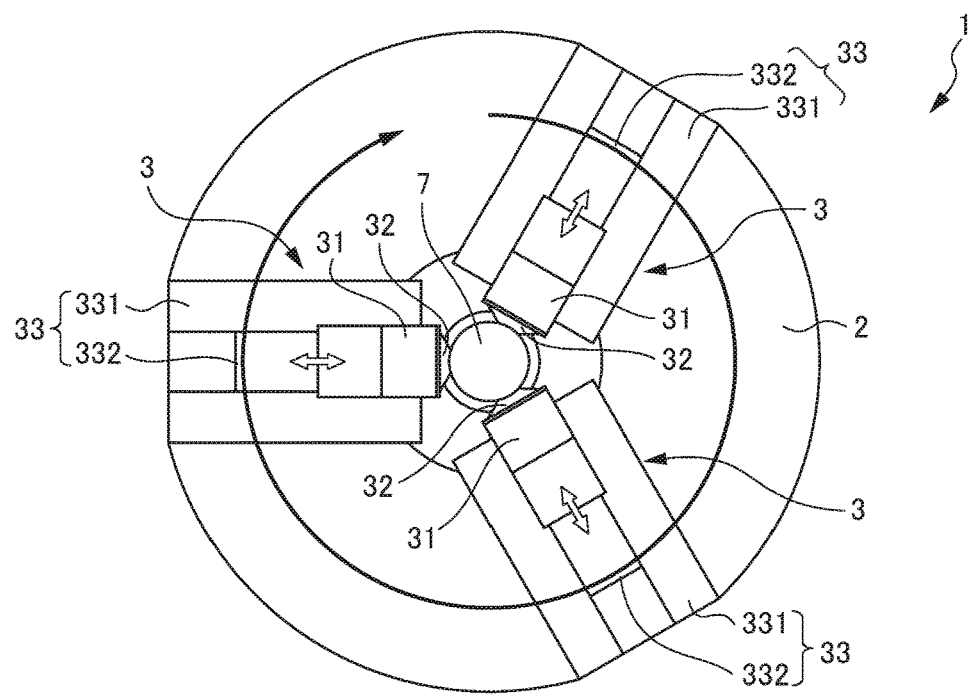
FIG. 2 is a bottom view of a shaft precision automatic measuring device for a motor according to the first embodiment.
Figure 3:
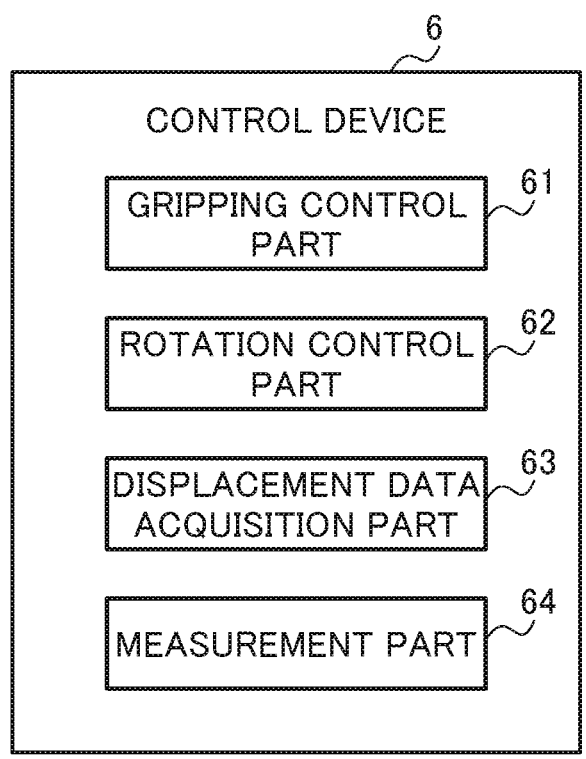
FIG. 3 is a block diagram showing the configuration of a control device equipped to the shaft precision automatic measuring device for a motor according to the first embodiment.

FIG. 1 is a side view of a shaft precision automatic measuring device 1 for a motor according to a first embodiment. FIG. 2 is a bottom view of the shaft precision automatic measuring device 1 for a motor according to the first embodiment. FIG. 3 is a block diagram showing the configuration of a control device 6 equipped to the shaft precision automatic measuring device 1 for a motor according to the first embodiment. It should be noted that, for convenience, FIG. 2 omits illustration of a first contact-type displacement sensor 41 and a second contact-type displacement sensor 42.

The shaft precision automatic measuring device 1 for a motor according to the present embodiment makes it possible to automatically measure the shaft precision of a motor 9 including a shaft 7, and motor main body 8 having a fitting face (in-low face) 81 of a fitting part (in-low part) which is fitted to a mounting target of the motor 9, and a flange face 82.

Herein, various machine tools can be exemplified as the mounting target of the motor 9, for example. The fitting face 81 and flange face 82 are fitted to the mounting target, and resultingly become references defining the position or slope of the shaft 7 of the motor 9 relative to the mounting target.

As shown in FIGS. 1 to 3, the shaft precision automatic measuring device 1 for a motor according to the present embodiment includes: a device main body 2, gripping mechanisms 3, a first contact-type displacement sensor 41, a second contact-type displacement sensor 42, a rotary mechanism 5, and a control device 6.

The device main body 2 has a cylinder shape, and configures a base of the shaft precision automatic measuring device 1 for a motor. This device main body 2 is configured to be rotatable by way of the rotary mechanism 5 described later. The gripping mechanisms 3, first support part 41*b* supporting the first contact-type displacement sensor 41, and a second support part 42*b* supporting the second contact-type displacement sensor 42 described later are provided to a bottom face side of the device main body 2.

The gripping mechanisms 3 are provided to the bottom face of the device main body 2, and are controlled by a gripping control part 61 of the control device 6 described later to grip the shaft 7 of the motor 9. In the present embodiment, three of the gripping mechanisms 3 are provided at equal intervals in a circumferential direction; however, it is not limited thereto. The gripping mechanism 3 includes a gripping claw 31, a cushioning member 32, and slide mechanism 33.

The gripping claw 31 has an L-shape in a side view, and becomes able to approach and distance relative to the shaft 7, by way of the slide mechanism 33 described later. The cushioning member 32 having a curved outer shape is provided to a leading end face of the gripping claw 31. A situation is avoided in which the gripping claw 31 collides with the shaft 7 and the shaft 7 is damaged by way of this cushioning member 32.

The slide mechanism 33 includes a slide rail 331, a slide guide 332, a feed-screw mechanism (not illustrated), for example, and a slide drive motor (not illustrated).

The slide rail 331 is provided to extend in the radial direction along the bottom face of the device main body 2. The gripping claw 31 is fixed to the slide guide 332, and this slide guide 332 fits to be slidably movable in the slide rail 331. The feed-screw mechanism connected to the output shaft of the slide drive motor threads with the gripping claw 31. The gripping claw 31 thereby slidingly moves along the slide rail 331 via the slide guide 332 to become able to approach or distance relative to the shaft 7.

The first contact-type displacement sensor 41 is arranged along a vertical direction 8 (direction orthogonal to the flange face 82, which is the central axis Y direction of the motor main body 8), and is fixed to be supported at the bottom face of the device main body 2 by the first support part 41*b*. The first contact-type displacement sensor 41 has a probe 41*a* at a leading end thereof, and the probe 41*a* is configured to be able to make contact following the flange face 82 of the motor 9. The first contact-type displacement sensor 41 thereby becomes able to measure the position of the flange face 82 and the displacement thereof. The detection signal of the first contact-type displacement sensor 41 is sent to the control device 6 described later.

The probe 41*a* of the present embodiment includes a spindle mechanism (not illustrated) having an air cylinder structure, and is able to expand and contract. For this reason, the probe 41*a* becomes able to contact following against the flange face 82, without a drive source, by being arranged to be biased towards the flange face 82. However, without being limited thereto, a linear guide mechanism may be applied in place of the spindle guide, for example, and in this case as well, it is possible to make the probe 41*a* contact following against the flange face 82, without requiring a drive source.

The second contact-type displacement sensor 42 is arranged along the horizontal direction (plane direction of the flange face 82, which is a direction orthogonal to the central axis Y of the motor main body 8), and is fixed to be supported at the bottom face of the device main body 2 by way of the second support part 42*b*. The second contact-type displacement sensor 42 has a probe 42*a* at the leading end thereof, and the probe 42*a* is configured to be able to make contact following against the fitting face 81 of the motor 9. The second contact-type displacement sensor 42 thereby becomes able to measure the position of the fitting face 81 and the displacement thereof. The detection signal of the second contact-type displacement sensor 42 is sent to the control device 6 described later.

The probe 42*a* of the present embodiment includes a spindle mechanism (not illustrated) having an air cylinder structure, similarly to the aforementioned probe 41*a*, and is able to expand and contract. For this reason, the probe 42*a* becomes able to contact following against the fitting face 81, without a drive source, by being arranged so as to be biased towards the fitting face 81. However, without being limited thereto, a linear guide mechanism may be applied in place of the spindle guide, for example, and the probe 42*a* becomes able to make contact following the fitting face 81 by way of its own weight without requiring a drive source, by configuring a linear guide mechanism that extends from obliquely above towards the fitting face 81, for example.

In addition, in the case of the measurement target being a small-scale motor, for example, since there is a risk of the second contact-type displacement sensor 42 interfering with the motor and damage occurring to the motor, the shape of the probe meeting the measurement target is selected as appropriate in the second contact-type displacement sensor 42. For example, as the shape of the probe, it is possible to select as appropriate from small-diameter type, flat-plate type, roller type, needle type, off-set type, etc.

The rotary mechanism 5 is provided to an upper face side of the device main body 2, and is controlled by the rotary control part 62 of the control device 6 described later to cause the device main body 2 to rotate. The rotary mechanism 5 includes a drive source such as a rotary drive motor (not illustrated), and thereby causes the device main body 2 to rotate with the central axis Y of the motor 9 as the axis of rotation.

The control device 6 includes a gripping control part 61, a rotation control part 62, a displacement data acquisition part 63, and a measurement part 64. These functional parts are realized by way of prescribed software stored in a storage unit being executed by a CPU. More specifically, measurement of the shaft precision of the motor 9 expressed by center runout and face deflection of the shaft 7 becomes possible automatically, by the shaft precision measurement processing described later being executed by these functional parts.

Herein, shaft precision expressed by center runout and face deflection of the shaft 7 will be explained in detail by referencing FIGS. 4 to 6.

Figure 4:
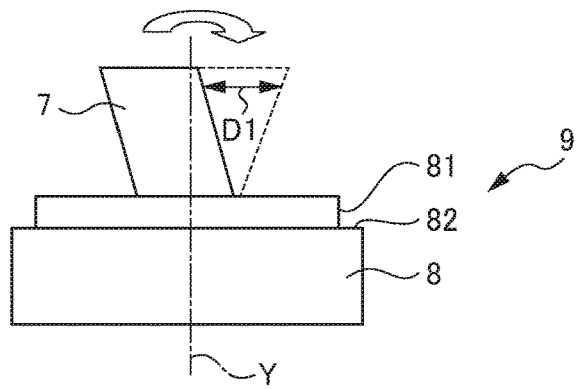
FIG. 4 is a view illustrating shaft deflection of the motor.

FIG. 4 is a view illustrating shaft deflection of the motor 9. FIG. 5 is a view illustrating eccentricity of the motor 9. FIG. 6 is a view illustrating face deflection of the motor 9.

In the present embodiment, center runout of the shaft 7 is defined by one or both among shaft deflection and eccentricity of the shaft 7. In addition, the face deflection of the shaft 7 is defined by the deflection angle of the shaft 7.

As shown in FIG. 4, the shaft deflection of the shaft 7 indicates the rotary deflection of the leading end of the shaft 7 when causing the shaft 7 to rotate with the central axis Y of the motor main body 8 as the axis of rotation. FIG. 4 shows a state when the leading end of the shaft 7 shifted D1 in the radial direction. This shaft deflection occurs due to curvature, warping, bending, etc. of the shaft 7.

Figure 5:
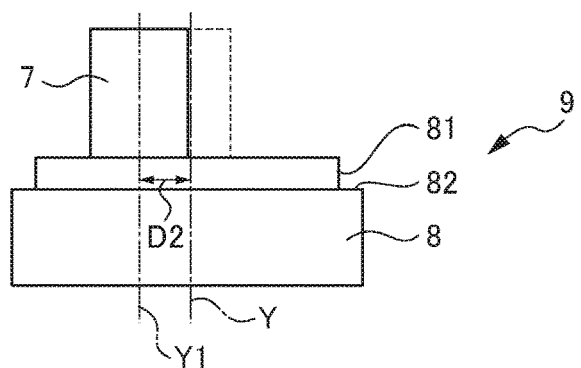
FIG. 5 is a view illustrating eccentricity of the motor.
Figure 7:
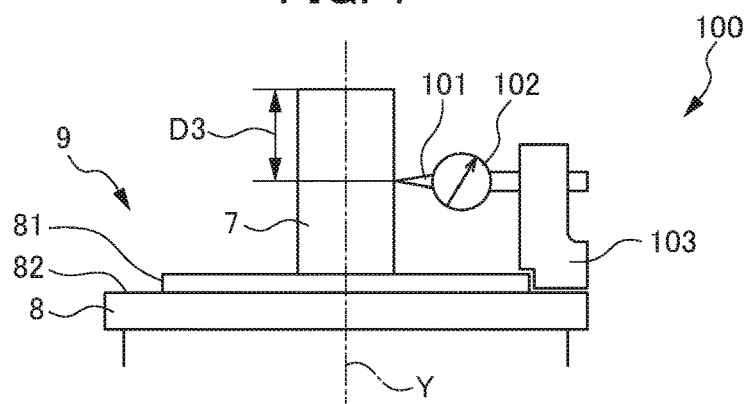
FIG. 7 is a view showing a conventional method of measuring shaft deflection.

In addition, as shown in FIG. 5, eccentricity of the shaft 7 indicates the shift of the center line Y1 of the shaft 7 relative to the central axis Y of the motor main body 8. FIG. 7 shows a state when the center line Y1 of the shaft 7 is shifted D2 in the radial direction from the central axis Y. This shows being assembled by the center line Y1 of the shaft 7 being shifted from the center of an in-low part of the motor main body 8 (fitting part with the mounting target of the motor 9), and is also called in-low deflection.

Figure 6:
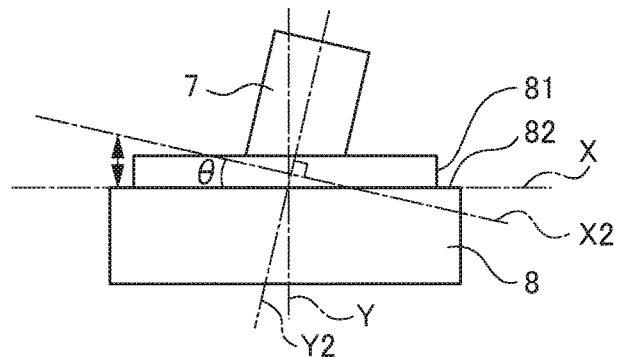
FIG. 6 is a view illustrating face deflection of the motor.

In addition, as shown in FIG. 6, the deflection angle of the shaft 7 indicates the slope of the shaft 7 relative to the flange face 82 of the motor main body 8 fitted to the mounting target of the motor 9. More specifically, as shown in FIG. 6, it is represented by an angle θ formed between a line X2 orthogonal to the center line Y2 of the shaft 7 and a line X (horizontal line) along the flange face 82.

Next, a conventional measurement method for the shaft precision of a motor will be explained while referencing FIGS. 7 and 9.

FIG. 7 is a view showing a conventional shaft deflection measurement method, which conventionally measures the shaft deflection of the shaft 7 by fixing a main body 103 of a dial gauge 100 on the flange face 82, rotating the shaft 7 in a state contacting a gauge head 101 against an outer circumferential face of the shaft 7 (position a predetermined distance D3 below from an upper end of the shaft 7), and reading a scale 102.

Figure 8:
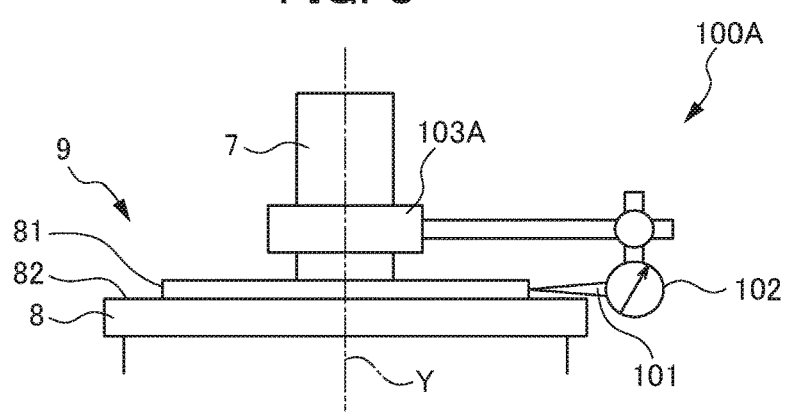
FIG. 8 is a view showing a conventional method of measuring eccentricity.

In addition, FIG. 8 is a view showing a conventional eccentricity measurement method, which conventionally measures the eccentricity of the shaft 7 by fixing a main body 103A of a dial gauge 100A to the shaft 7, rotating the shaft 7 in a state contacting a gauge head 101 against the fitting face 81, and reading the scale 102.

Figure 9:
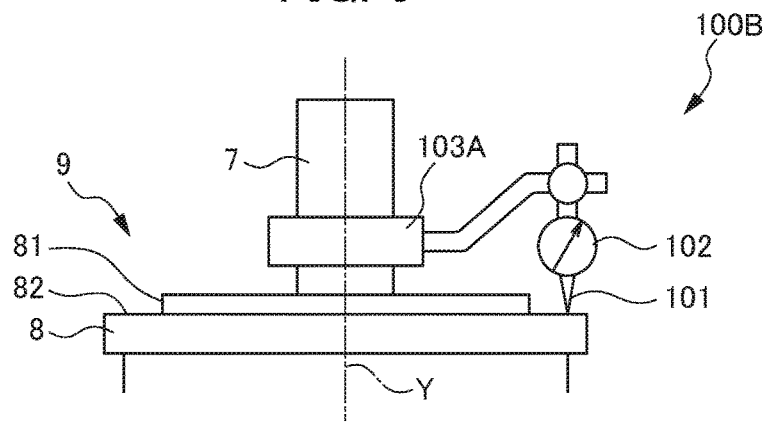
FIG. 9 is a view showing a conventional method of measuring face deflection.

In addition, FIG. 9 is a view showing a conventional face deflection measurement method, which conventionally measures the deflection angle of the shaft 7, by fixing a main body 103A of a dial gauge 100B to the shaft 7, rotating the shaft 7 in a state contacting a gauge head 101 against the flange face 82, and reading the scale 102.

In the aforementioned such measurement of the shaft precision using a conventional dial gauge, the measurement workload by a laborer, such as the mounting of the dial gauge, contact adjustment of the measurement head, measurement while rotating the shaft of the motor, confirmation and recording of measurement values, has been large and the productivity low. In addition, since mistakes such as variance in the way of contacting of the gauge head and misreading of the measurement values by the laborer can also occur, variance tends to occur in the results, whereby the inspection precision has been low. In the case of the number of motors being great, complete inspection is not possible due to man-hour limitations, and thus must become sequential sampling inspection.

In contrast, with the shaft precision automatic measuring device 1 for a motor of the present embodiment, measurement of shaft precision becomes possible automatically by way of the shaft precision measurement processing by the control device 6.

Hereinafter, the shaft precision measurement processing by the control device 6 will be explained in detail by referencing FIG. 10.

Figure 10:
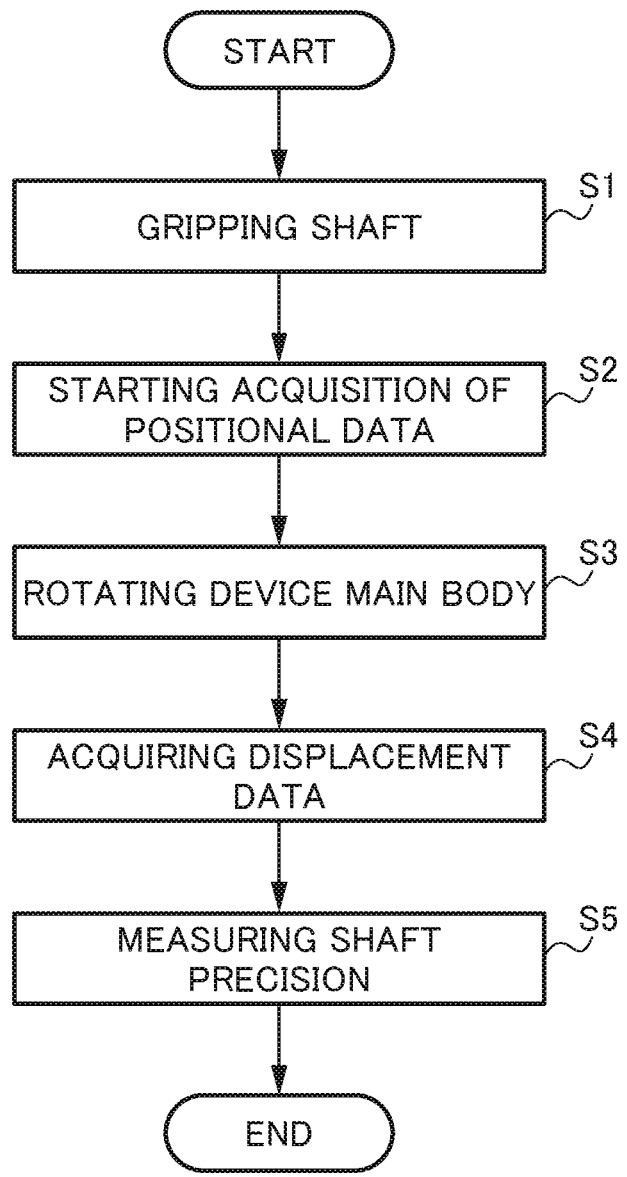
FIG. 10 is a flowchart showing a sequence of shaft precision measurement processing by the control device equipped to the shaft precision automatic measuring device for a motor according to the first embodiment.

FIG. 10 is a flowchart showing a sequence of shaft precision measurement processing by the control device 6.

First, in Step S1, the shaft 7 of the motor 9 which is the measurement target is gripped by the gripping mechanisms 3. More specifically, the shaft 7 of the motor 9 is made to be gripped by three of the gripping claws 31, by controlling the three gripping mechanisms 3 by way of the gripping control part 61.

Next, in Step S2, the acquisition of respective positional data of the flange face 82 and fitting face 81 is begun. More specifically, the acquisition of the positional data of the flange face 82 by the first contact-type displacement sensor 41 is started, and acquisition of the positional data of the fitting face 81 by the second contact-type displacement sensor 42 is started. Acquisition of positional data is continued also in subsequent steps.

Next, in Step S3, the device main body 2 is made to rotate. More specifically, the device main body 2 is made to rotate by controlling the rotary mechanism 5 by way of the rotation control part 62. There is no limitation in the number of revolutions, and the device main body 2 is rotated one revolution, for example. In addition, regarding the revolution speed, there is no particular limitation so long as being in a range not hindering measurement. At this time, the shaft 7 is in a state remaining gripped by the gripping mechanism 3, as well as being a state in which measurement is executed by way of the first contact-type displacement sensor 41 and second contact-type displacement sensor 42.

Next, in Step S4, the respective displacement data of the flange face 82 and fitting face 81 is acquired. More specifically, the displacement data acquisition part 63 acquires the displacement data of the flange face 82 from the positional data of the flange face 82 by the first contact-type displacement sensor 41 during rotation of the device main body 2. Simultaneously, displacement data of the fitting face 81 is acquired from the positional data of the fitting face 81 by the second contact-type displacement sensor 42.

Next, in Step S5, the shaft precision of the motor 9 is measured. More specifically, the shaft precision of the motor 9 (center runout and face deflection of shaft 7) is measured based on the displacement data of the flange face 82 and the displacement data of the fitting face 81 acquired by the displacement data acquisition part 63. After measurement completion, the main processing is ended.

The following effects are exerted according to the shaft precision automatic measuring device 1 for a motor of the present embodiment explained above.

The present embodiment provides the gripping mechanisms 3 that grip the shaft 7; the first contact-type displacement sensor 41 that is able to measure the position of the flange face 82 by contacting to follow the flange face 82; the second contact-type displacement sensor 42 that is able to measure the position of the fitting face 81 by contacting to follow the fitting face 81; and the rotary mechanism 5 that causes the device main body 2 to rotate, in a state executing measurement according to the respective displacement sensors while gripping the shaft 7 by way of the gripping mechanisms 3. Then, it is made a configuration that acquires the displacement data of the flange face 82 and the displacement data of the fitting face 81 by the displace data acquisition part 63, and measures the center runout and face deflection of the shaft 7 by way of the measurement part 64 based on the respective displacement data acquired by the displacement data acquisition part 63.

According to the shaft precision automatic measuring device 1 for a motor according to the present embodiment, it is thereby possible to automatically measure the shaft precision of the motor 9 (the center runout and face deflection of the shaft 7). For this reason, it is possible to improve the inspection precision compared to conventionally, and complete inspection is possible even in the case of the number of motors 9 that are the measurement targets being great.

Second Embodiment

Figure 11:
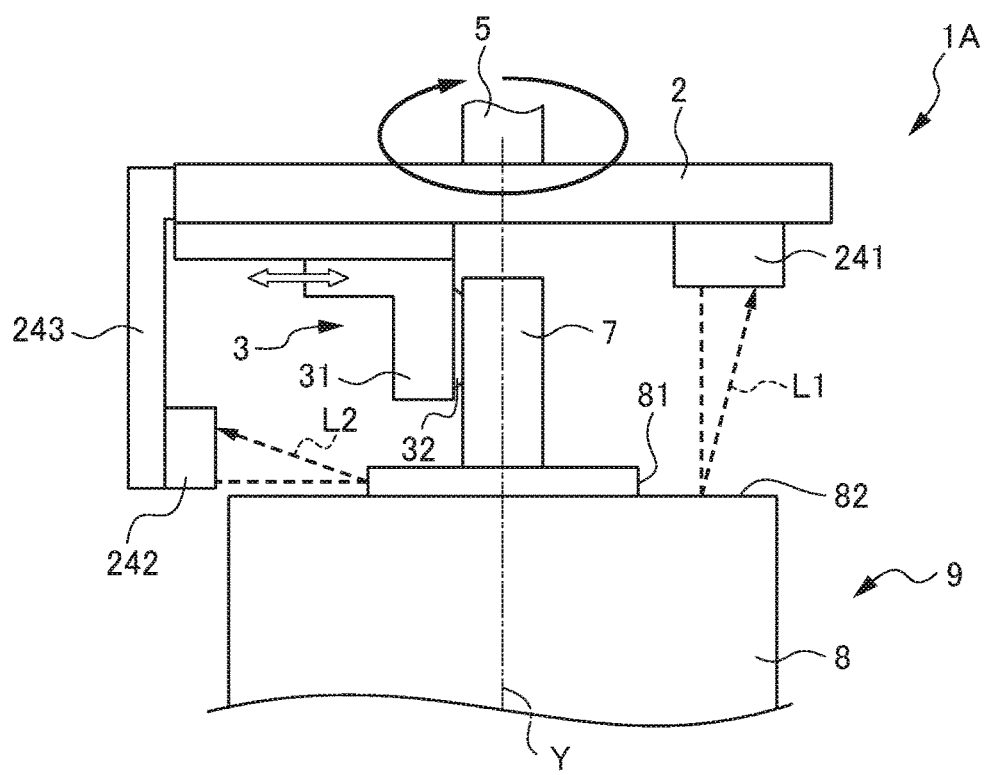
FIG. 11 is a side view of a shaft precision automatic measuring device for a motor according to a second embodiment.

FIG. 11 is a side view of a shaft precision automatic measuring device 1A for a motor according to a second embodiment.

The shaft precision automatic measuring device 1A for a motor according to the present embodiment differs from the first embodiment in the point of including a first laser-type displacement sensor 241 and second laser-type displacement sensor 242, in place of the first contact-type displacement sensor 41 and second contact-type displacement sensor 42.

The first laser-type displacement sensor 241 is provided to be fixed to the bottom face of the device main body 2. The first laser-type displacement sensor 241 irradiates a laser beam L1 onto a lower flange face 82, and becomes able to measure the position of the flange face 82 by way of the reflected light thereof. The detection signal of the first laser-type displacement sensor 241 is sent to the control device 6. It is possible to use a known laser range finder as the first laser-type displacement sensor 241.

The second laser-type displacement sensor 242 is provided to be fixed to the lateral face of the device main body 2 via a mounting member 243 which extends downwards. The second laser-type displacement sensor 242 irradiates a laser beam L2 onto the fitting face 81, and becomes able to measure the position of the fitting face 81 by way of the reflected light thereof. The detection signal of the second laser-type displacement sensor 242 is sent to the control device 6. It is possible to use a well-known laser range finder as the second laser-type displacement sensor 242, similarly to the first laser-type displacement sensor 241.

In addition, with the present embodiment, the displacement data acquisition part 63 acquires the displacement data of the flange face 82 by way of the first laser-type displacement sensor 241 and the displacement data of the fitting face 81 by way of the second laser-type displacement sensor 242.

The shaft precision automatic measurement device 1A for a motor according to the present embodiment is able to measure the shaft precision of the motor 9 (center runout and face deflection of the shaft 7), by way of shaft precision measurement processing by the control device 6, similarly to the first embodiment. Therefore, similar effects as the first embodiment are exerted by way of the shaft precision automatic measuring device 1A for a motor of the present embodiment.

Third Embodiment

Figure 12:
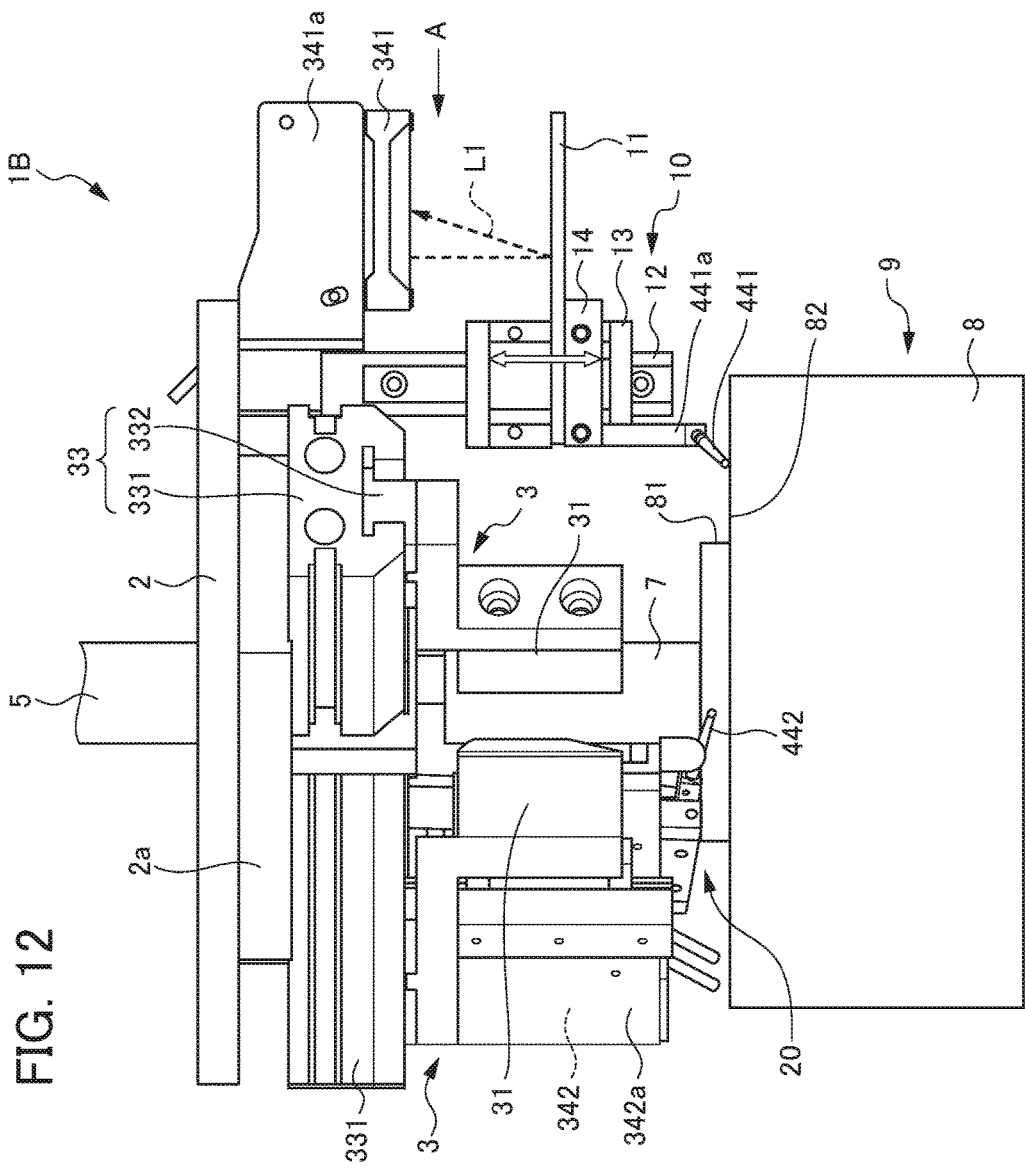
FIG. 12 is a first side view of a shaft precision automatic measuring device for a motor according to a third embodiment.
Figure 13:
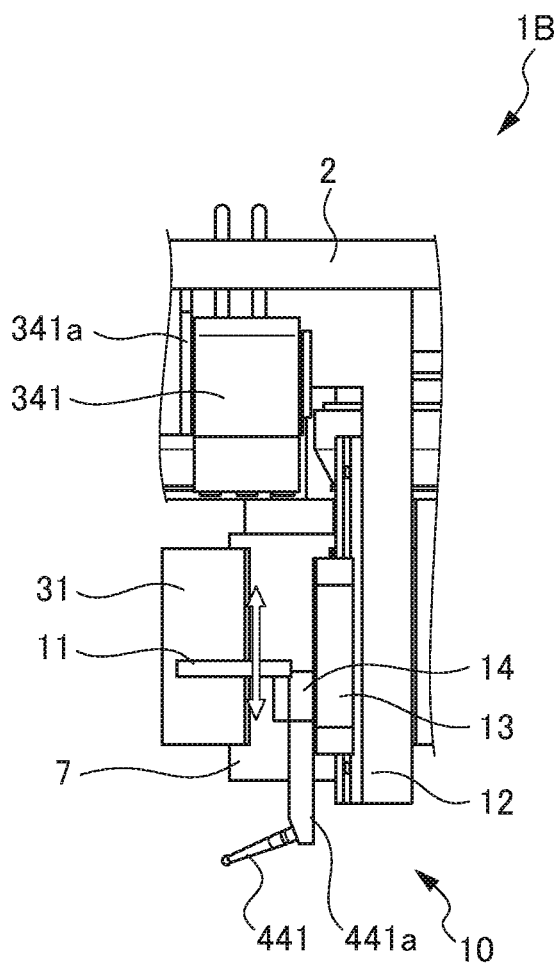
FIG. 13 is view along the arrow A in FIG. 12.
Figure 14:
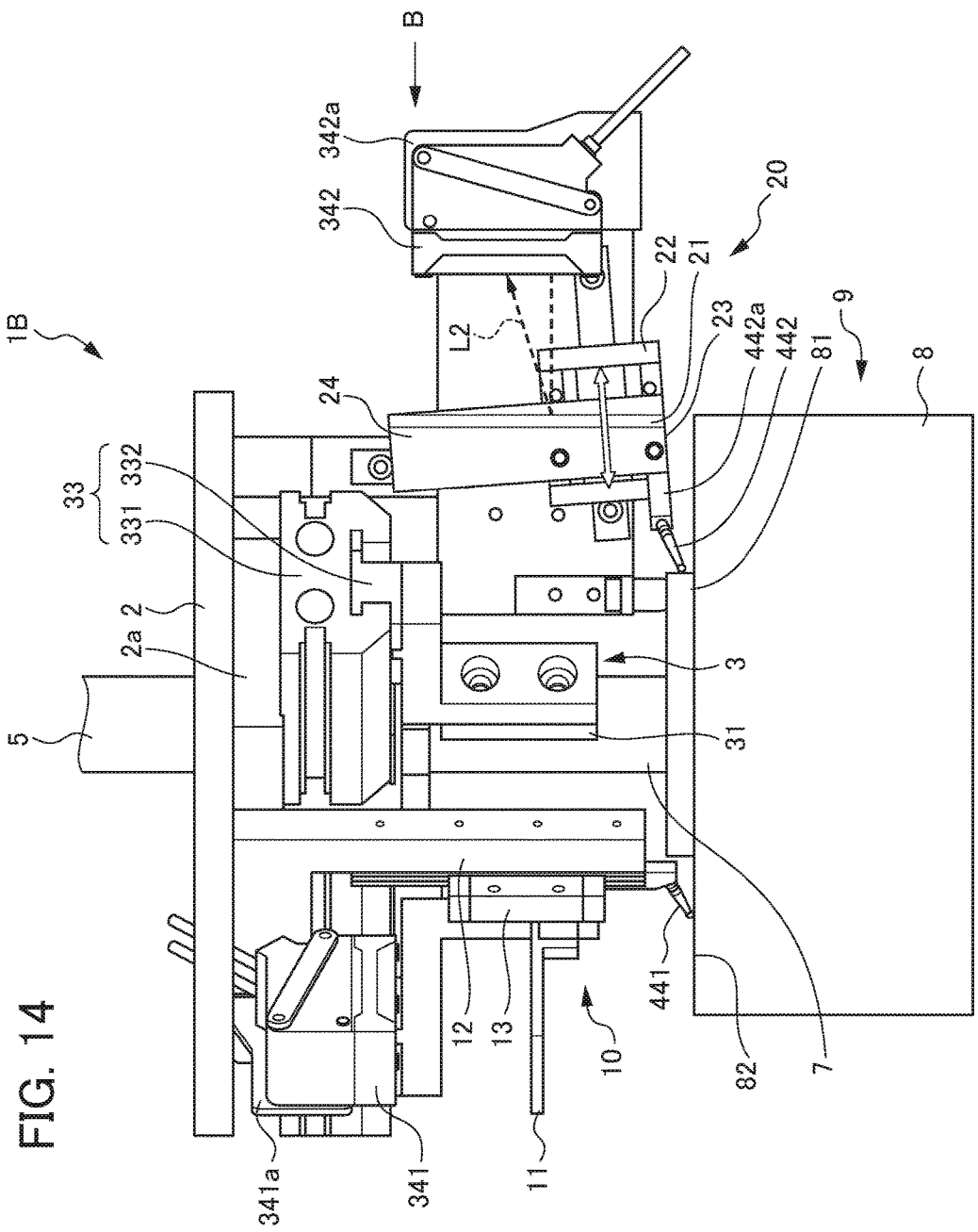
FIG. 14 is a second side view of the shaft precision automatic measuring device for a motor according to the third embodiment.
Figure 15:
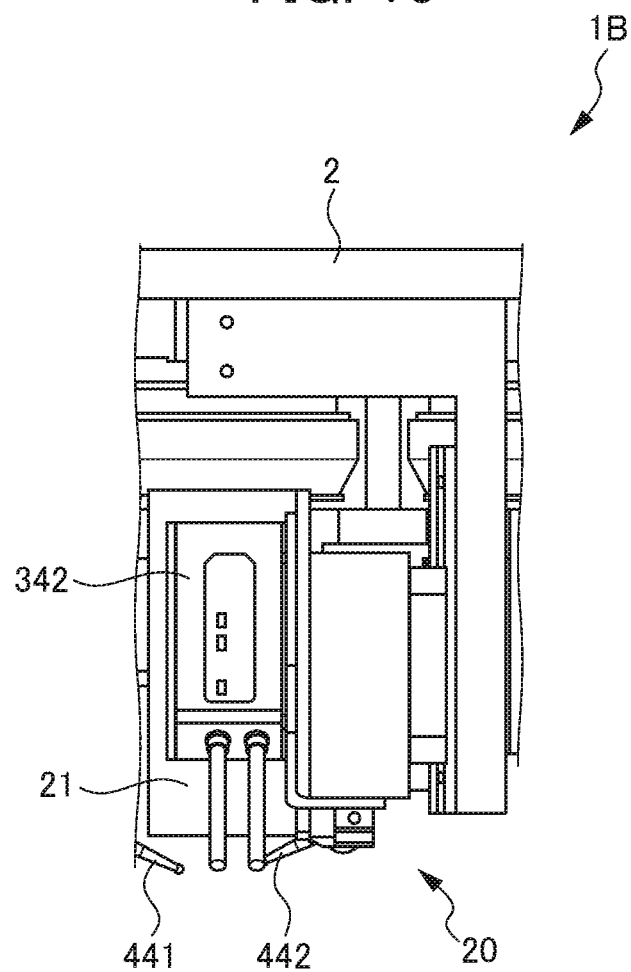
FIG. 15 is a view along the arrow B in FIG. 14.
Figure 16:
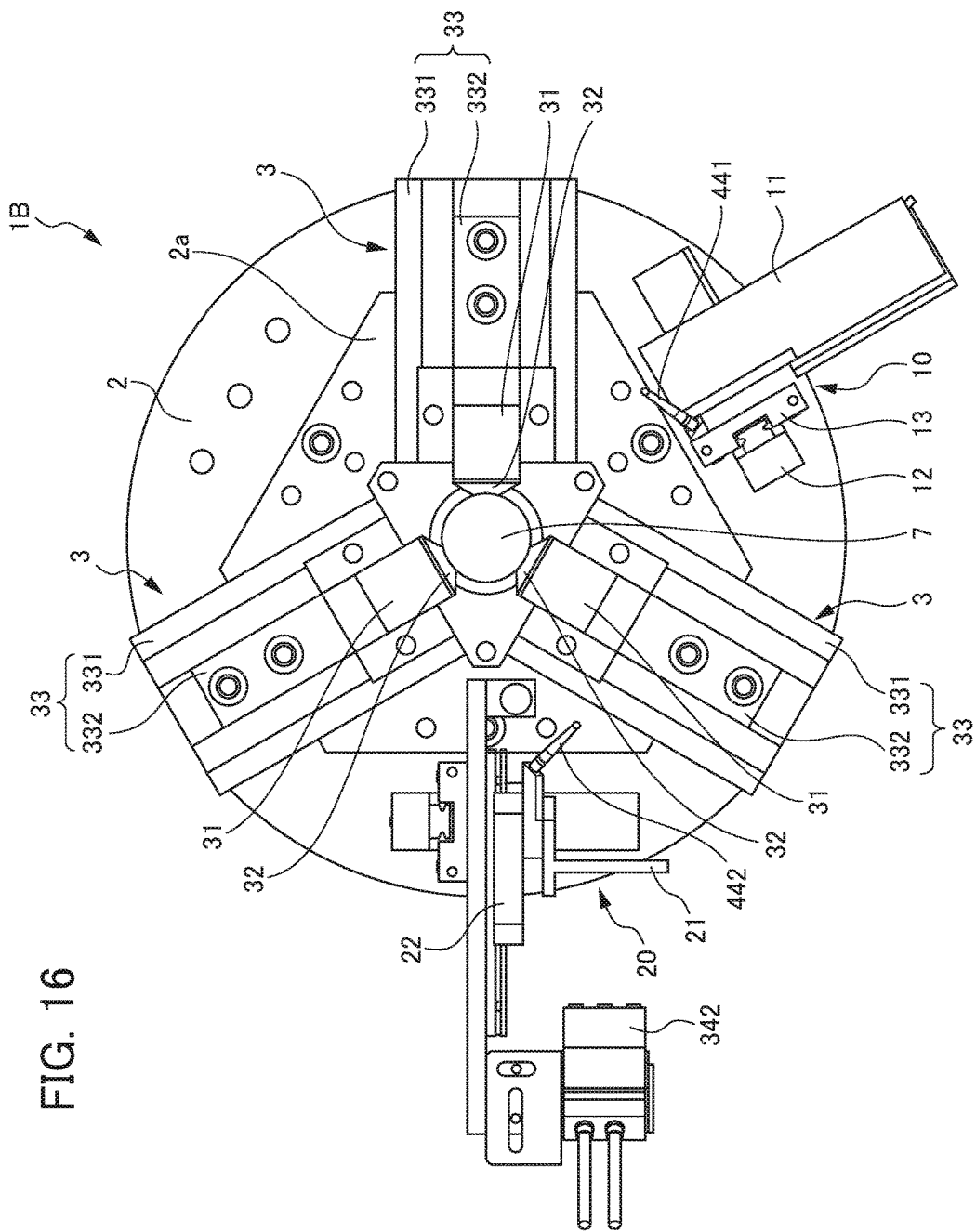
FIG. 16 is a bottom view of the shaft precision automatic measuring device for a motor according to the third embodiment.

FIG. 12 is a first side view of a shaft precision automatic measuring device 1B for a motor according to a third embodiment. FIG. 13 is a view along the arrow A in FIG. 12. FIG. 14 is a second side view of the shaft precision automatic measuring device 1B for a motor according to the third embodiment. FIG. 15 is a view along the arrow B in FIG. 14. FIG. 16 is a bottom view of the measuring device 1B for a motor according to the third embodiment.

The shaft precision automatic measuring device 1B for a motor according to the present embodiment differs in the point of including a first laser-type displacement sensor 341, first jig 10, and first probe 441, in place of the first contact-type displacement sensor 41. In addition, it differs from the first embodiment in the point of including a second laser-type displacement sensor 342, second jig 20 and second probe 442, in place of the second contact-type displacement sensor 42.

As shown in FIGS. 12, 13 and 16, the first laser-type displacement sensor 341 is provided to be fixed to a support stand 2a installed to the bottom face of the device main body 2, via the mounting member 341a. The first laser-type displacement sensor 341 irradiates the laser beam L1 substantially vertically onto a laser-beam reflecting plate 11 described later, which is arranged along a substantially horizontal direction, and becomes able to measure the position of the first jig 10 (position of the laser-beam reflecting plate 11) described later by way of the reflected light thereof. The detection signal of the first laser-type displacement sensor 341 is sent to the control device 6.

The first jig 10 includes the laser-beam reflecting plate 11, a slide guide 13 that fits to be slidingly movable to the slide rail 12, and a fixing part 14.

The laser-beam reflecting plate 11 is fixed to the slide guide 13 via the fixing part 14 as well as the first probe 441 described later. The slide guide 13 is slidingly movable relative to the slide rail 12 which is fixed to the device main body 2 and extends in a vertical direction. The first jig 10 including the laser-beam reflecting plate 11 thereby becomes moveable in a vertical direction, i.e. perpendicular direction relative to the flange face 82.

The first probe 441 is fixed to the slide guide 13 via the support part 441 and fixing part 14. In other words, the first probe 441 is fixed to the first jig 10; therefore, it is moveable in the perpendicular direction relative to the flange face 82 along with the first jig 10 including the laser-beam reflecting plate 11, and becomes able to contact following the flange face 82. The position of the flange face 82 thereby becomes measurable by measuring the position of the first jig 10 (position of the laser-beam reflecting plate 11).

As shown in FIGS. 14 to 16, the second laser-type displacement sensor 342 is provided to be fixed to the support stand 2a that is installed to the bottom face of the device main body 2, via the mounting member 342a. The second laser-type displacement sensor 342 irradiates a laser beam L2 substantially perpendicular to a laser-beam reflecting plate 21 described later, which is arranged along a substantially vertical direction, and becomes able to measure the position of a second jig 20 described later (position of the laser-beam reflecting plate 21) by way of the reflected light thereof. The detection signal of the second laser-type displacement sensor 342 is sent to the control device 6.

The second jig 20 includes a laser-beam reflecting plate 21, a slide guide 23 that fits in the slide rail 22 to be slidingly movable, and a fixing part 24.

The laser-beam reflecting plate 21 is fixed to the slide guide 23 via the fixing part 24, along with the second probe 442 described later. The slide guide 23 is slidingly movable relative to the slide rail 22 that is fixed to the device main body 2, and slopes to extend downwards as approaching a side of the second probe 442. The second jig 20 including the laser-beam reflecting plate 21 thereby becomes movable in a direction sloping to intersect the flange face 82.

The second probe 442 is fixed to the slide guide 23 via the support part 442a and fixing part 24. In other words, the second probe 442 is fixed to the second jig 20; therefore, it is moveable in a direction sloped to intersect relative to the fitting face 81 along with the second jig 20 including the laser-beam reflecting plate 21, and becomes able to contact following the fitting face 81. The position of the fitting face 81 thereby becomes measurable by measuring the position of the second jig 20 (position of the laser-beam reflecting plate 21).

It should be noted that, since the slide rail 22 extends to slope downwards from the top, upon gripping the shaft 7 by way of the gripping mechanisms 3 during measurement start, for example, the second probe 442 makes a structure that contacts with the fitting face 81 naturally by way of its own weight along with the second jig 20 that includes the laser-beam reflecting plate 21.

In addition, in the present embodiment, the displacement data acquisition part 63 acquires displacement data of the flange face 82 by way of the first laser-type displacement sensor 341 and displacement data of the fitting face 81 by way of the second laser-type displacement sensor 342.

The shaft precision automatic measurement device 1B for a motor of the present embodiment is able to measure the shaft precision of the motor 9 (center runout and face deflection of the shaft 7), by way of shaft precision measurement processing by the control device 6, similarly to the first embodiment. Therefore, similar effects as the first embodiment are exerted according to the shaft precision automatic measurement device 1B for a motor of the present embodiment.

Fourth Embodiment

Figure 17:
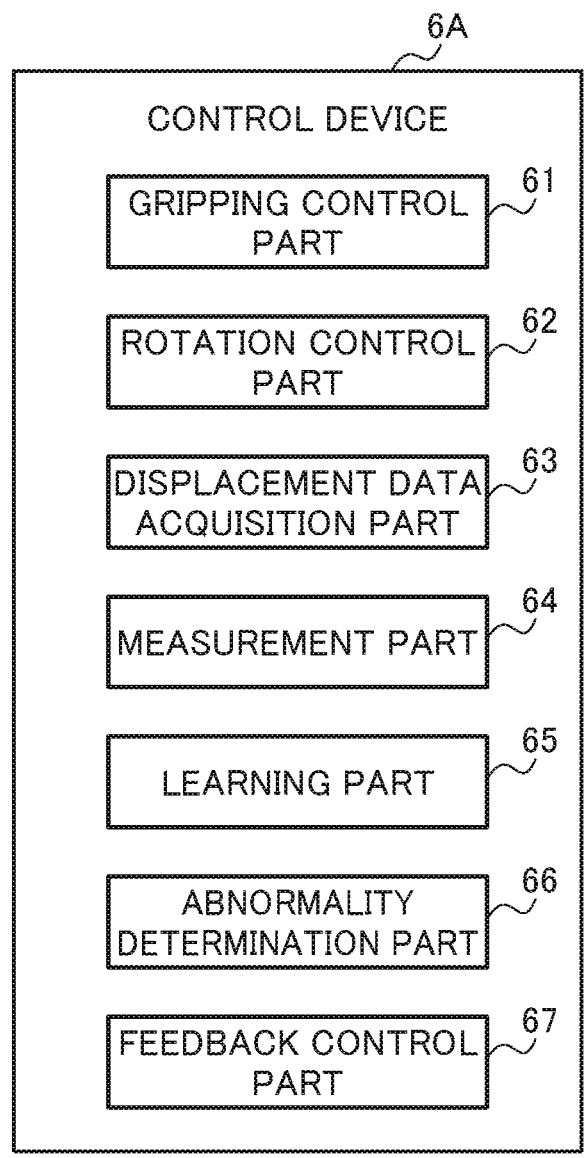
FIG. 17 is a block diagram showing the configuration of a control device equipped to a shaft precision automatic measuring device for a motor according to a fourth embodiment.

FIG. 17 is a block diagram showing the configuration of a control device 6A equipped to a shaft precision automatic measurement device for a motor according to a fourth embodiment. As shown in FIG. 17, the shaft precision automatic measurement device for a motor according to the present embodiment differs from the first embodiment in the configuration of the control device 6A. More specifically, it differs from the first embodiment in the point of the control device 6A further including a learning part 65, abnormality determination part 66 and feedback control part 67. It should be noted that the control device 6A of the present embodiment is not limited to the first embodiment, and is also applicable to the second embodiment and third embodiment.

The control device 6A further includes the learning part 65, abnormality determination part 66, and feedback control part 67, in addition to the aforementioned gripping control part 61, rotation control part 62, displacement data acquisition part 63 and measurement part 64. These functional parts are realized by way of prescribed software stored in a storage unit being executed by a CPU. More specifically, the aforementioned shaft precision measurement processing is executed, as well as learning processing and feedback control processing described later being executed by these functional parts.

Hereinafter, learning processing by the control device 6A will be explained in detail by referencing FIG. 18.

Figure 18:
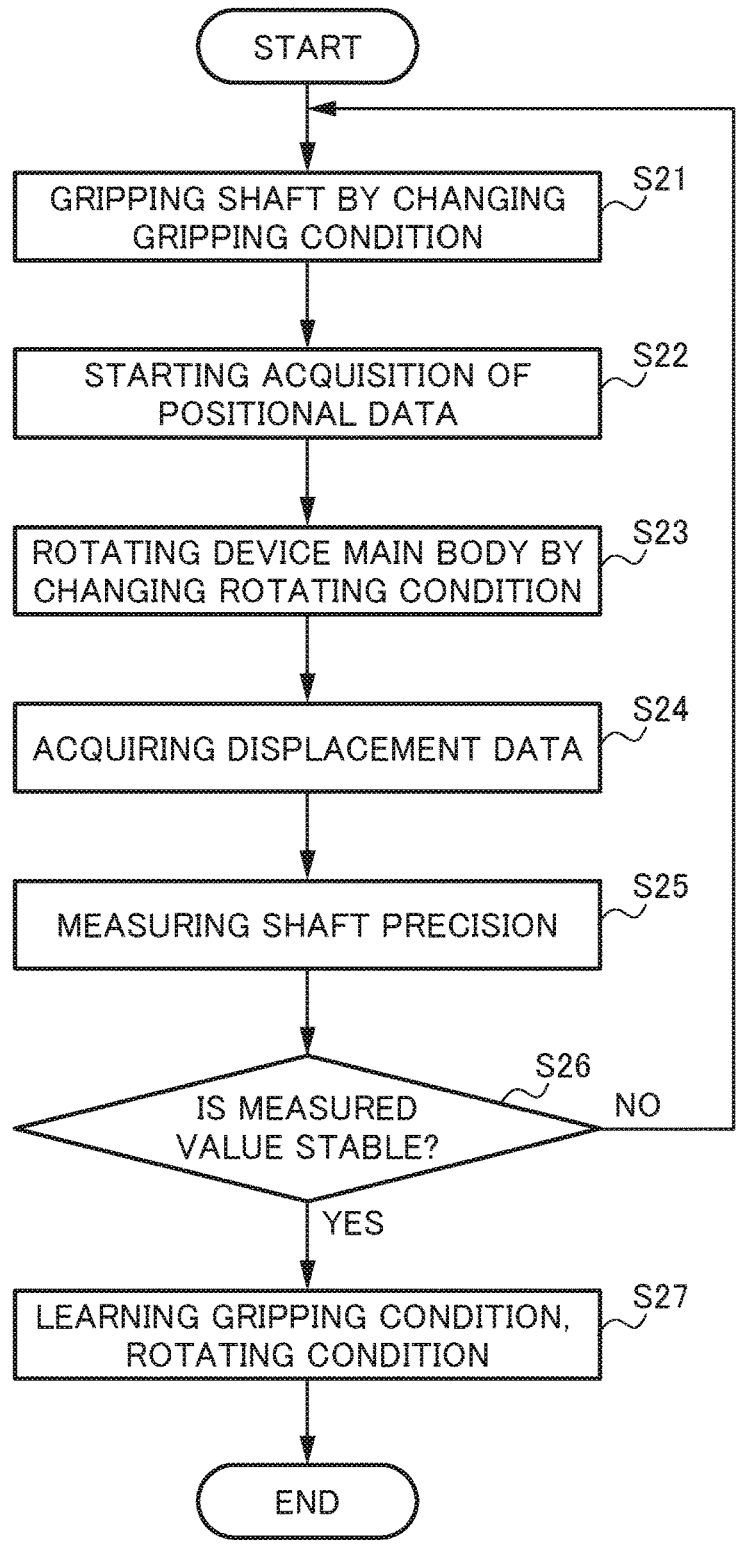
FIG. 18 is a flowchart showing a sequence of shaft precision measurement processing by the control device equipped to the shaft precision automatic measuring device for a motor according to the fourth embodiment.

FIG. 18 is a flowchart showing the sequence of learning processing by the control device 6A equipped to the shaft precision automatic measurement device for a motor according to the fourth embodiment. This learning processing learns the gripping condition of the gripping mechanisms 3 and the rotating condition of the rotary mechanism 5.

First, in Step S21, after changing the gripping condition such as the gripping force and movement (gripping) speed of the gripping mechanisms 3 to a condition different from the previous gripping condition, the shaft 7 of the motor 9 which is the measurement target is gripped. More specifically, the three gripping mechanisms 3 are controlled by the gripping control part 61 to cause the shaft 7 of the motor 9 to be gripped by the three gripping claws 31.

Next, in Step S22, acquisition of the respective positional data of the flange face 82 and fitting face 81 is started. More specifically, acquisition of the positional data of the flange face 82 by the first contact-type displacement sensor 41 is started, and acquisition of positional data of the fitting face 81 by the second contact-type displacement sensor 42 is started. The acquisition of positional data is continued in the subsequent steps.

Next, in Step S23, after changing the rotating condition such as the revolution speed of the rotary mechanism 5 to a condition differing from the previous rotating condition, the device main body 2 is made to rotate. More specifically, the rotary mechanism 5 is controlled by the rotation control part 62 to cause the device main body 2 rotate. At this time, the shaft 7 is in a state remaining gripped by the gripping mechanisms 3, and is in a state in which measurement is being executed by the first contact-type displacement sensor 41 and second contact-type displacement sensor 42.

Next, in Step S24, the respective displacement data of the flange face 82 and fitting face 81 is acquired. More specifically, the displacement data acquisition part 63 acquires the displacement data of the flange face 82 from the positional data of the flange face 82 by the first contact-type displacement sensor 41 during rotation of the device main body 2. Simultaneously, displacement data of the fitting face 81 is acquired from the positional data of the fitting face 81 by the second contact-type displacement sensor 42.

Next, in Step S25, the shaft precision of the motor 9 is measured. More specifically, the shaft precision of the motor 9 (center runout and face deflection of shaft 7) is measured by the measurement part 64, based on the displacement data of the flange face 82 and the displacement data of the fitting face 81 acquired by the displacement data acquisition part 63.

Next, in Step S26, it is determined whether the measured value for the shaft precision obtained in Step S25 is stable. More specifically, it is determined if the measured value for the shaft precision is a stable value based on the fluctuation from the previous measured value.

In the case of this determination being NO, the measurement of the shaft precision is executed again at a different gripping condition and rotating condition by returning to S21. In addition, in the case of this determination being YES, the processing advances to Step S27, learns the gripping condition and rotating condition at this time, and ends the main processing.

Next, the feedback control processing by the control device 6A will be explained in detail by referencing FIG. 19.

Figure 19:
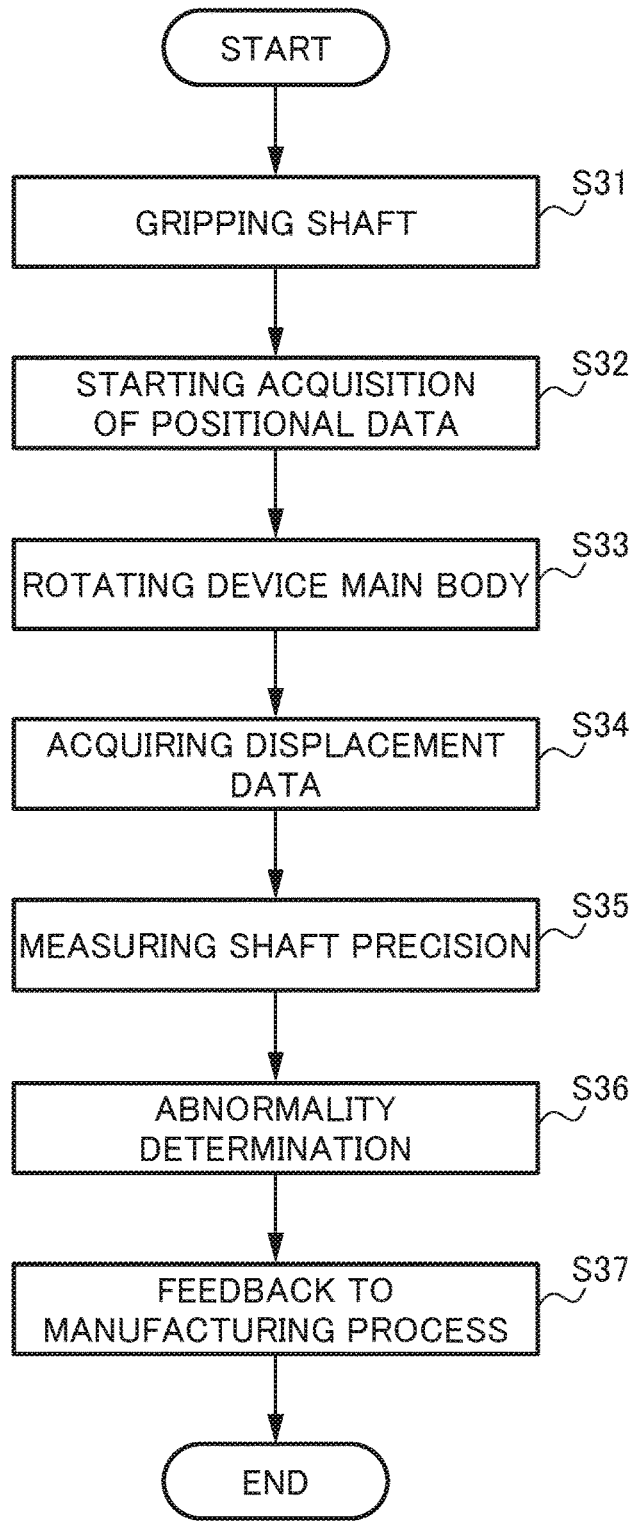
FIG. 19 is a flowchart showing a sequence of shaft precision measurement processing by a feedback control device equipped to the shaft precision automatic measuring device for a motor according to the fourth embodiment.

FIG. 19 is a flowchart showing the sequence of feedback control processing by the control device 6A equipped to the shaft precision automatic measurement device for a motor according to the fourth embodiment. In this feedback control processing, the abnormality determination for the shaft 7 of the motor 9 is executed based on the measured value for shaft precision, and the abnormality determination result thereof is fed back to the manufacturing process of the motor 9.

Steps S31 to S35 execute similar processing to Steps S1 to S5 of the aforementioned shaft precision measurement processing.

Next, in Step S36, it determines whether the shaft 7 of the motor 9 is abnormal, based on the measured value for the shaft precision obtained in Step S35. More specifically, in the case of comparing with a predetermined threshold and having exceeding the threshold value, for example, it is determined that the shaft 7 of the motor 9 is abnormal.

Next, in Step S37, the abnormality determination result obtained in Step S36 is fed back to the manufacturing process of the motor 9. More specifically, it is automatically fed back to the manufacturing process of the motor 9 according to the type of shaft precision. For example, in the case of shaft deflection (rotary deflection), by feeding back this information to a manufacturing cell of the shaft 7 or motor assembly cell, an improvement in this process becomes possible. Similarly, by feeding back this information to one manufacturing cell for the stator in the case of eccentricity, or stator manufacturing cell and motor assembly cell in the case of face deflection (deflection angle), or the like, an improvement in this process becomes possible. Subsequently, the main processing is ended.

According to the shaft precision automatic measurement device for a motor of the present embodiment, the following effects are exerted in addition to effects similar to the first embodiment.

In the present embodiment, the learning part 65 is provided for learning the gripping condition of the gripping mechanisms 3 and the rotating condition of the rotary mechanism 5. Although initial setting of the gripping mechanisms 3 and rotary mechanism 5 is still performed by hand, since the measurement device learns the gripping condition and rotating condition automatically, it is thereby possible to reduce the burden for adjusting the measurement device by hand. In addition, it is possible to automatically handle various shapes and diameters of the shaft 7.

In addition, the present embodiment provides the abnormality determination part 66 that determines whether there is an abnormality in the shaft 7 of the motor 9 based on the measured value for the shaft precision, and the feedback control part 67 that feeds back this abnormality determination result to the manufacturing process of the motor 9. In the case of there being abnormality in the shaft 7 of the motor 9, feedback thereby becomes possible automatically in the manufacturing process of the motor 9 according to the type of shaft precision. Therefore, based on the feedback information to each manufacturing process according to the type of shaft precision, it is possible to notify of a machine abnormality from the history of the machine tool, assembly tool, handling robot device, or the like used in each manufacturing process, and a process improvement becomes possible.

It should be noted that the present invention is not to be limited to the above-mentioned first to third embodiments, and that modifications and improvements in a scope that can achieve the object of the present invention are also included in the present invention.

EXPLANATION OF REFERENCE NUMERALS 1, 1A, 1B shaft precision automatic measurement device for motor
2 device main body
3 gripping mechanism (gripping part)
5 rotary mechanism (rotary part)
7 shaft
8 motor main body
9 motor
10 first jig
11, 21 laser-beam reflecting plate
20 second jig
41 first contact-type displacement sensor 42 second contact-type displacement sensor
61 gripping control part
62 rotary part
63 displacement data acquisition part
64 measurement part
65 learning part
66 abnormal determination part
67 feedback control part
81 fitting face
82 flange face
241, 341 first laser-type displacement sensor
242, 342 second laser-type displacement sensor
441 first probe
442 second probe

What is claimed is:

1. A shaft precision automatic measurement device for a motor that includes a shaft, and a motor main body having a flange face and a fitting face to be fitted to a mounting target of the motor, the device comprising:
a device main body;
a gripping part that is provided to the device main body, and grips the shaft;
a first contact-type displacement sensor that is provided to the device main body, and is able to measure a position of the flange face by contacting to follow the flange face;
a second contact-type displacement sensor that is provided to the device main body, and is able to measure a position of the fitting face by contacting to follow the fitting face;
a rotary part that causes the device main body to rotate in a state gripping the shaft by way of the gripping part, and executing measurement by way of the first contact-type displacement sensor and the second contact-type displacement sensor;
a displacement data acquisition part that acquires displacement data of the flange face from the first contact-type displacement sensor and displacement data of the fitting face from the second contact-type displacement sensor; and
a measurement part that, when defining, while causing the shaft to rotate, one or both of a shaft deflection that indicates a rotary deflection of a leading end of the shaft, and an eccentricity that indicates a shift in center line of the shaft relative to a central axis of the motor main body as a center runout, and defining a deflection angle that indicates slope of the shaft relative to the flange face as a face deflection,
measures the center runout and the face deflection of the shaft based on respective displacement data from the first contact-type displacement sensor and the second contact-type displacement sensor acquired by the displacement data acquisition part.

2. A shaft precision automatic measurement device for a motor that includes a shaft, and a motor main body having a flange face and a fitting face to be fitted to a mounting target of the motor, the device comprising:
a device main body;
a gripping part that is provided to the device main body, and grips the shaft;
a first laser-type displacement sensor that is provided to the device main body, and is able to measure a position of the flange face by way of reflected light when irradiating a laser beam onto the flange face;
a second laser-type displacement sensor that is provided to the device main body, and is able to measure a position of the fitting face by way of reflected light when irradiating a laser beam onto the fitting face;
a rotary part that causes the device main body to rotate in a state gripping the shaft by way of the gripping part, and executing measurement by way of the first laser-type displacement sensor and the second laser-type displacement sensor;
a displacement data acquisition part that acquires displacement data of the flange face from the first laser-type displacement sensor and displacement data of the fitting face from the second laser-type displacement sensor; and
a measurement part that, when defining, while causing the shaft to rotate, one or both of a shaft deflection that indicates a rotary deflection of a leading end of the shaft, and an eccentricity that indicates a shift in center line of the shaft relative to a central axis of the motor main body as a center runout, and defining a deflection angle that indicates slope of the shaft relative to the flange face as a face deflection,
measures the center runout and the face deflection of the shaft based on respective displacement data from the first contact-type displacement sensor and the second contact-type displacement sensor acquired by the displacement data acquisition part.

3. A shaft precision automatic measurement device for a motor that includes a shaft, and a motor main body having a flange face and a fitting face to be fitted to a mounting target of the motor, the device comprising:
a device main body;
a gripping part that is provided to the device main body, and grips the shaft;
a first jig that is provided to the device main body, is movable in a direction intersecting the flange face, and has a laser-beam reflecting plate;
a first laser-type displacement sensor that is provided to the device main body, and is able to measure a position of the first jig by way of reflected light when irradiating a laser beam onto the laser-beam reflecting plate of the first jig;
a first probe that is fixed to the first jig, and contacts to follow the flange face by the first jig moving in a direction intersecting the flange face;
a second jig that is provided to the device main body, is movable in a direction intersecting the fitting face, and has a laser-beam reflecting plate;
a second laser-type displacement sensor that is provided to the device main body, and is able to measure a position of the second jig by way of reflected light when irradiating a laser beam onto the laser-beam reflecting plate of the second jig;
a second probe that is fixed to the second jig, and contacts to follow the fitting face by the second jig moving in a direction intersecting the fitting face;
a rotary part that causes the device main body to rotate in a state gripping the shaft by way of the gripping part, and executing measurement by way of the first laser-type displacement sensor and the second laser-type displacement sensor;
a displacement data acquisition part that acquires displacement data of the first jig from the first laser-type displacement sensor and displacement data of the second jig from the second laser-type displacement sensor; and
a measurement part that, when defining, while causing the shaft to rotate, one or both of a shaft deflection that indicates a rotary deflection of a leading end of the shaft, and an eccentricity that indicates a shift in center line of the shaft relative to a central axis of the motor main body as a center runout, and defining a deflection angle that indicates slope of the shaft relative to the flange face as a face deflection, measures the shaft deflection, the eccentricity and the deflection angle of the shaft based on displacement data from the first contact-type displacement sensor and the second contact-type displacement sensor acquired by the displacement data acquisition part.

4. The shaft precision automatic measurement device for a motor according to claim 1, further comprising a learning part that learns a gripping condition of the gripping part and a rotating condition of the rotary part, when measured values of the shaft deflection, the eccentricity and the deflection angle of the shaft obtained by executing measurement by way of the measurement part become stable values while varying at least one among the gripping condition of the gripping part and the rotating condition of the rotary part.

5. The shaft precision automatic measurement device for a motor according to claim 2, further comprising a learning part that learns a gripping condition of the gripping part and a rotating condition of the rotary part, when measured values of the shaft deflection, the eccentricity and the deflection angle of the shaft obtained by executing measurement by way of the measurement part become stable values while varying at least one among the gripping condition of the gripping part and the rotating condition of the rotary part.

6. The shaft precision automatic measurement device for a motor according to claim 3, further comprising a learning part that learns a gripping condition of the gripping part and a rotating condition of the rotary part, when measured values of the shaft deflection, the eccentricity and the deflection angle of the shaft obtained by executing measurement by way of the measurement part become stable values while varying at least one among the gripping condition of the gripping part and the rotating condition of the rotary part.

7. The shaft precision automatic measurement device for a motor according to claim 1, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

8. The shaft precision automatic measurement device for a motor according to claim 2, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

9. The shaft precision automatic measurement device for a motor according to claim 3, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

10. The shaft precision automatic measurement device for a motor according to claim 4, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

11. The shaft precision automatic measurement device for a motor according to claim 5, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

12. The shaft precision automatic measurement device for a motor according to claim 6, further comprising:

an abnormality determination part that determines whether the shaft of the motor is abnormal based on measured values of the shaft deflection, the eccentricity and the deflection angle of the shaft obtained by executing measurement by way of the measurement part; and a feedback control part that automatically feeds back an abnormality determination result thereof to a manufacturing process of the motor, in a case of being determined that the shaft of the motor is abnormal by way of the abnormality determination part.

* * * * *